Sept. 25, 1923.
J. B. COTTAM
1,468,995
VENTILATING GATE FOR BEEHIVES
Filed July 21, 1922
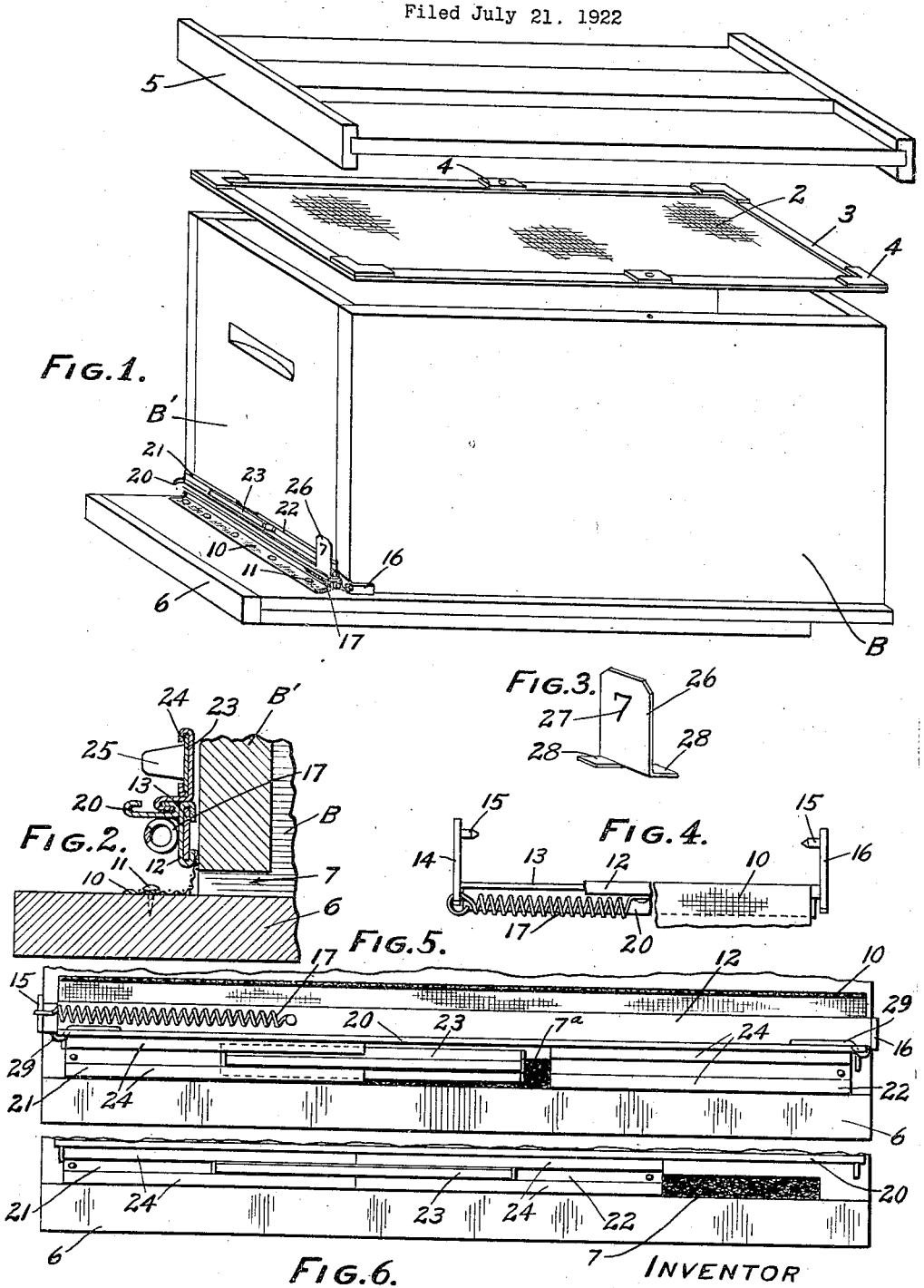
INVENTOR
JOHN B. COTTAM
BY Hazard and Miller
ATT'YS.

Patented Sept. 25, 1923.

1,468,995

UNITED STATES PATENT OFFICE.

JOHN B. COTTAM, OF MONTECITO, CALIFORNIA.

VENTILATING GATE FOR BEEHIVES.

Application filed July 21, 1922. Serial No. 576,574.

*To all whom it may concern:*

Be it known that I, JOHN B. COTTAM, a citizen of the United States, residing at Montecito, in the county of Santa Barbara and State of California, have invented new and useful Improvements in Ventilating Gates for Beehives, of which the following is a specification.

This invention relates to apiarist's supplies and more particularly to a gate device for beehives.

It is an object of the present invention to provide a simple, practicable, substantial and durable form of reversible gate for beehives, and particularly to provide a gate which, when in one position, forms an effective barrier for preventing the egress of bees from a hive during shipment and yet providing for ample ventilation of the hive through the ingress opening. Another object is to provide a shipping gate that may be readily applied to forms of beehives and which gate is adapted to provide for application to beehives which may vary in their width across the front at the gate.

A further object of the invention is to provide a beehive gate that may be arranged in one of its positions so that it will readily provide for the control of exit and ingress through the opening or gate of the beehive and, therefore, to regulate the access to different compartments or sections of the beehive. In practice it is found desirable, for certain reasons, to limit the entrance and egress to either end or to the central portion of a beehive, and to accomplish this my invention consists of a gate structure including means adjustable to cover or uncover any suitable portion of the beehive.

Another object is to provide an adjustable gate structure that may be readily set so as to prevent the "robbing" of the hive by robber bees. To that end, I have provided a device having the above and other objects in view as will be rendered manifest in the following specification of an embodiment of the invention which is illustrated in the accompanying drawings, wherein:

Figure 1 is a perspective of a beehive showing the shipping gate applied and secured for shipment of the hive; the top cover members of the hive being spaced to illustrate their construction and arrangement.

Fig. 2 is a vertical, substantially full scale sectional view of the landing platform and the entrance to the beehive and showing the shipping and ventilating gate as applied.

Fig. 3 is a perspective of a form of identification tag or marker which is to be combined with the gate.

Fig. 4 is a plan showing contracted fragments of the gate in the inverted position and illustrating the telescopic parts thereof.

Fig. 5 is a front elevation of the inverted gate as disposed along the beehive entrance with the parts adjusted so as to provide for exit of but a single bee at a time, the parts being arranged to prevent robbing.

Fig. 6 is a front elevation of the gate with the parts adjusted along the beehive entrance to regulate the control so as to guide the bees into one end thereof.

While my invention may be incorporated in structures adaptable to various types of beehives, it is shown, in the present case, as designed to be applied to a beehive of the rectangular box construction B having an open top end over which may be arranged a ventilating screen 2 of any suitable construction which may be bound in a frame 3 having a flat under face applicable to the rim or edge of the box walls. The top of the frame is provided with suitable spacing washers or lugs 4 so that when a closure or top 5 is applied there will be ample ventilation between the top of the screen and the bottom face of the closure 5.

The box or beehive B of this type is usually provided with a front wall B' slightly spaced above the bottom board 6 so as to provide an entrance or opening 7 of suitable height for the ingress and egress of bees.

Whenever it may be necessary to transfer the colonies of bees in the beehive from one location to another, it is necessary to close the entrance opening 7 to prevent the passage of the bees during such transportation. To that end, my present invention consists of a closure for effectively preventing the passage of the bees and which will, at the same time, provide for the ventilation of the beehive for such period of time as the opening is covered.

A preferred form of such closure consists of a perforated foraminous member, such as a strip of substantial wire gauze 10 having a length greater than the length of the opening 7 and having a height sufficient to fully cover the opening. Preferably, the strip 10 is of such width as to provide a flange or locking portion through which may be passed tacks or other simple fastening devices 11 whereby the foraminous closing strip 10 can be secured in position firmly. The strip is, in the present case, attached to a longitudinally extending bridge member 12 which is of C-form in cross section so as to slidably receive a tongue 13 to the outer end of which is secured a clamp jaw 14 which may be provided with a pin 15 to be driven into the side wall at the corner of the beehive.

The opposite end of the bridge member 12 is provided with a jaw 16 likewise having a fastening pin 15 to be driven into the opposite corner of the beehive. The two telescopic members 12 and 13 are normally contracted by a substantial spring 17, one end of which is attached to the jaw 14, while the opposite end is attached to a contiguous portion of the bridge member 12. This adjustment of the bridge or closure carrying device provides for the substantial application of the device to beehives which may vary in width across the front.

This bridge device further includes means enabling the use of the device for adjustment across the ingress and egress opening 7 of the beehive in such manner as to form an imperforate barrier or closure, which in its several adjustments provides for the control of the entry and exit of the bees to and from the hive.

As is clearly shown in Figures 2 and 5, the device is adapted to be applied in a reverse position so that the foraminous strip 10 can be applied either above the hive entrance or in covering position along the entrance.

It is frequently desirable, for reasons well known to apiarists, to cause the bees to enter the barrier at one end of the gateway 7 or at the other end, or again to enter wholly at the center of the beehive. Also it is frequently necessary to prevent bees from robbing hives, and in this case it is necessary to so restrict the area of the entrance opening 7 to the beehive that not more than one or two bees may find access to the hive, so that the guard bees within the hive can prevent the entrance of the robber bee. These several various requirements are provided for by my gate closure as follows:

Along one longitudinal edge of the bridge member 12 there is provided a forwardly extending horizontally arranged guide strip 20 which may be of C-form in cross section or otherwise suitably shaped as desired. When the bridge member 12 is applied as in Figs. 5 and 6 across the front of the beehive and just above the opening 7, the guide strip 20 occupies a position just above the top of the entrance opening. Slidably arranged in the guide strip is a pair of slides 21 and 22 which are each of a length about equal to one-third or more of the length of the bridge member so that the two slides 21 and 22 can be spaced apart from each other and thus cover the ends of the entrance gate as shown in Fig. 5. In this adjustment there is provided, therefore, an entrance opening between the contiguous ends of the slides 21 and 22 through which bees may be guided into and from the central portion of the beehive. This position of the slides or adjustable shutters is shown in Fig. 5. A further adjustment of the shutters is shown in Fig. 6 in which the shutters are set in abutment with each other thus covering about two-thirds of the entrance gate 7 and leaving the other portion uncovered as shown to the right of Fig. 6 and thus causing the bees to enter and leave the right hand end of the entrance opening 7.

When it is necessary to reduce the area of the bee entrance 7 to prevent robbing of the hives, the opening is reduced to the proper size by means of an auxiliary guard member which is in the form of a slide 23 which is slidably adjustable in the depending shutters 21 and 22; these latter being provided with longitudinal flanges 24 forming guideways in which the flat body member of the guard 23 is slidably movable. This adjustable guard may be provided with a forwardly extending handle portion 25 to facilitate its movement. In Fig. 5 the guard 23 is shown as shifted into such position as to form a very constricted opening 7ª through which only one or two bees can enter or pass at a time thus enabling the guard bees to protect the hive.

As the apiary may be provided with conventional or adopted code of signals or index system, I provide the gate bridge with means for holding a number tag or plate, one of which is shown in Fig. 3 as comprising a simple tag member 26 having a designating numeral or character 27. The bottom of the tag plate 26 is provided with flanges 28 which may be readily run into the forwardly extending strip 20 when the bridge is applied to the beehive in such manner as to position the ventilating closure 10 over the opening 7. Thus the identity of the beehive being transferred from place to place is maintained. This device provides for the interchange of identification symbols according to the code in use and eliminates a requirement of placing any identification number, as by painting, directly upon the beehive box, since the box may be transferred from place to place and given a number according to its position in a row, and, therefore, it is only necessary to change the number tags or signals 26 without mutilating or obliterating previous characters on the beehive box.

To prevent accidental dislodgment of the symbol tags 26 that may be arranged upon the bridge members, each of these is provided with a spring latch 29 at the end of the tag holding strip 20. The latch permits the tag to be readily positioned in the member and then snaps into place to hold it from dislodgment. The guide strip 20, therefore, forms a means for supporting the identification tags and also provides a support for the adjustable slides 21 and 22.

Further embodiments, modifications and changes may be resorted to within the spirit of the invention as here claimed.

What is claimed is:

1. A ventilating closure for beehives comprising a reversible bridge structure applicable to the front of the beehive and provided with a foraminous part adapted to cover the beehive opening.

2. A ventilating closure for beehives comprising a reversible bridge structure applicable to the front of the beehive and provided with a foraminous part adapted to cover the beehive opening, said structure including relatively adjustable members adapted to be clamped in position upon beehives of different widths.

3. A ventilating closure for beehives comprising a bridge structure applicable to the front of the beehive and provided with a foraminous part adapted to cover the beehive opening, said structure including relatively contractive adjustable members adapted to be clamped in position upon beehives of different widths, said members being provided with penetrating means adapted to be driven into the side walls of the hive to secure the bridge structure in place.

4. A ventilating closure for beehives comprising a bridge structure applicable to the front of the beehive, said structure including relatively adjustable members adapted to be clamped in position upon beehives of different widths, said adjustable members being yieldably connected so as to automatically clamp in position when applied to a beehive.

5. A gate structure for beehives comprising a bridge-like frame adapted to be secured to the front of the beehive contiguous to the opening thereof, adjustable end members carried by the frame and adapted to be positioned so as to define and limit the area of the entrance opening to the beehive, and a guard slidably carried by one of said members adapted to be shifted relative to said members to reduce the size of the opening formed thereby so as to prevent robbing of the hive.

6. A ventilating and adjustable gate for beehives comprising a bridge-like frame having slides for covering predetermined portions of the entrance to the hive and which gate is reversible and has a ventilating closure for preventing ingress and egress to and from the hive.

7. A closure for beehives consisting of a bridge-like structure applicable to the beehive and contiguous to the opening thereof and having means for controlling ingress and egress, and means for receiving and holding a system symbol concerning the beehive.

8. A ventilating closure for beehives comprising a bridge structure applicable to the front of the beehive and provided with a foraminous part adapted to cover the beehive opening, said structure including relatively adjustable members adapted to be clamped in position upon beehives of different widths, said adjustable members being yieldably connected so as to automatically clamp in position when applied to a beehive.

In testimony whereof I have signed my name to this specification.

JOHN B. COTTAM.